United States Patent [19]

Komatsu et al.

[11] 3,946,966
[45] Mar. 30, 1976

[54] AUTOMATIC STOP MECHANISM FOR AN ELECTRIC TAPE APPARATUS

[75] Inventors: Fumihito Komatsu, Suwa; Akihiko Isaka, Nagano, both of Japan

[73] Assignee: Kabushiki Kaisha Sankyoseiki Seisakusho, Nagano, Japan

[22] Filed: Sept. 9, 1974

[21] Appl. No.: 504,716

[30] Foreign Application Priority Data
Sept. 11, 1973 Japan............................. 48-102957
Oct. 27, 1973 Japan............................. 48-121511
Dec. 28, 1973 Japan............................. 49-1756[U]

[52] U.S. Cl................................. 242/191; 360/74
[51] Int. Cl.² B65H 59/38; G03B 1/02; G11B 15/32
[58] Field of Search.......................... 242/186–191; 360/71, 74

[56] References Cited
UNITED STATES PATENTS
3,582,013  6/1971  Beretta ............................... 242/186
3,637,163  1/1972  Apitz ................................. 242/191

Primary Examiner—Leonard D. Christian
Attorney, Agent, or Firm—Haseltine, Lake & Waters

[57] ABSTRACT

Automatic stop mechanism for an electronic tape apparatus such as a tape recorder. The stop mechanism operates mechanically and comprises a driven rotor or disc, a sensing wheel cup mounted on the disc, and an operating lever kicking out an unlocking means in order to cut off an electric driving source. When voltage of the source is lowered, the operating lever effectively operates by means of a centrifugal clutch mechanism contacting the sensing wheel cup. The clutch mechanism suitably cuts communication between the rotor and a tape reel.

10 Claims, 25 Drawing Figures

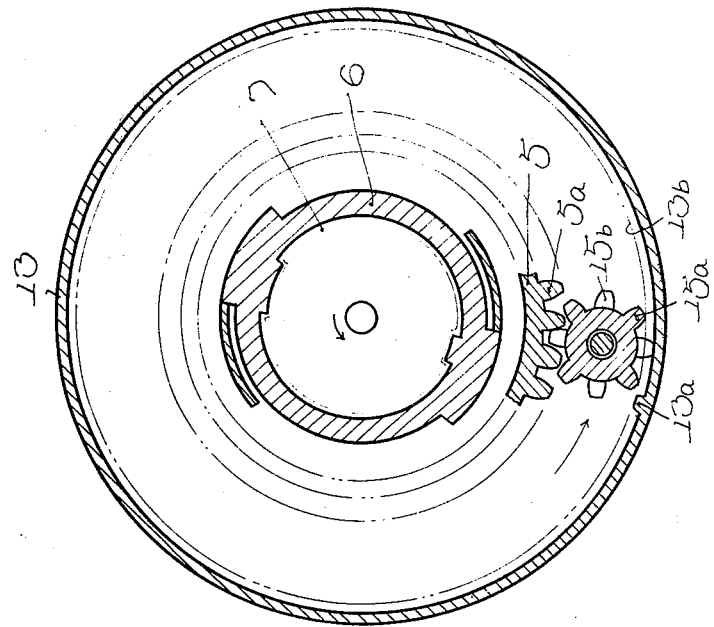
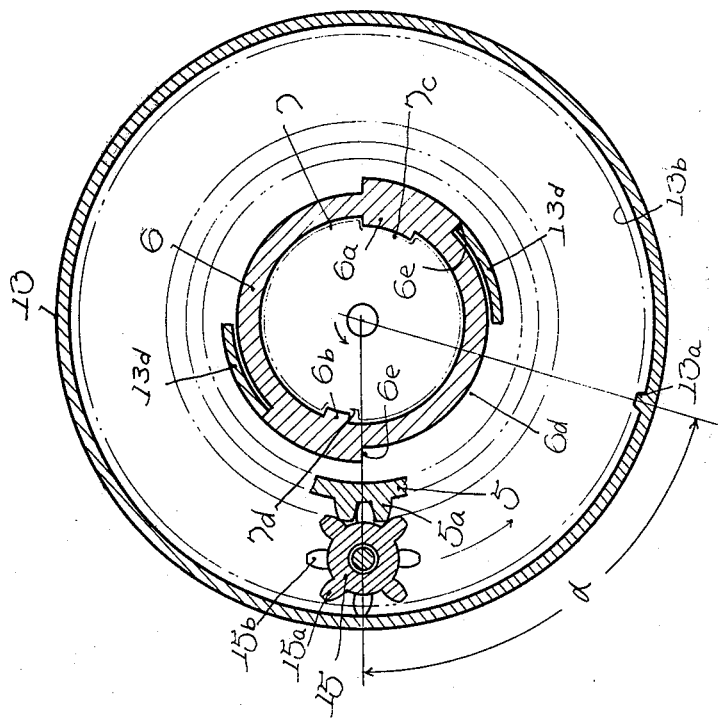

ANGULAR DISPLACEMENT OF FLY-
WHEEL RELATIVE TO DETECTER-
WHEEL

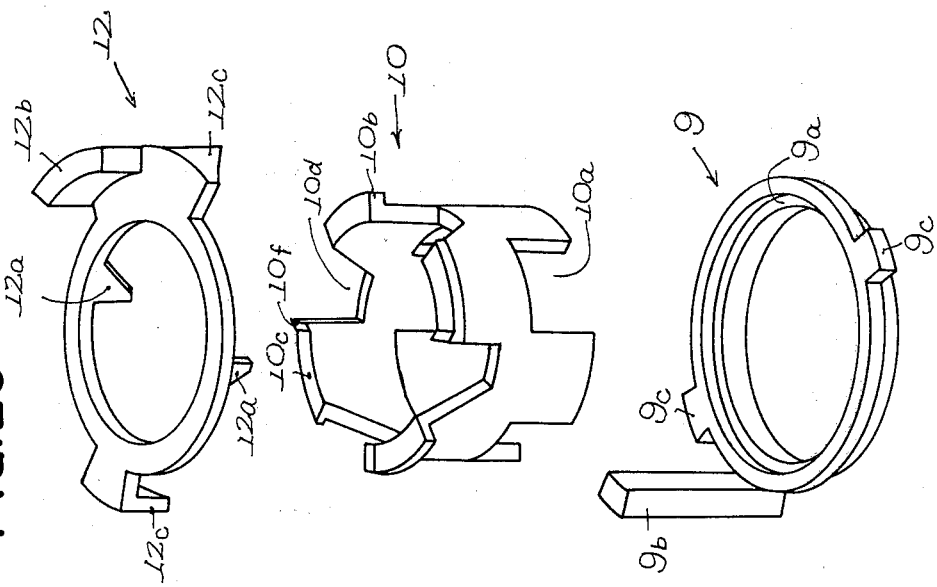
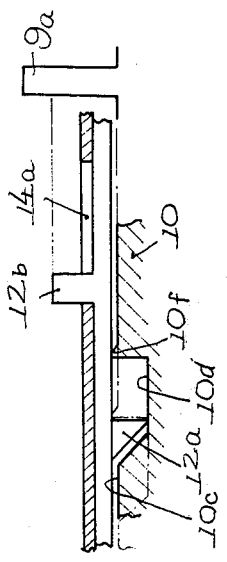
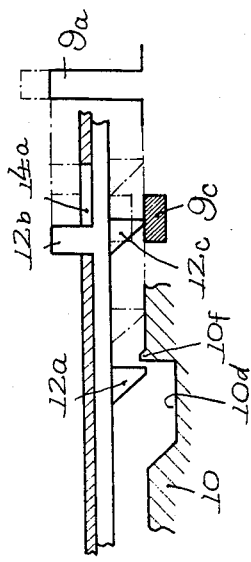

AUTOMATIC STOP MECHANISM FOR AN ELECTRIC TAPE APPARATUS

BACKGROUND OF THE INVENTION

This invention relates to an automatic shut-off device for a tape transport mechanism such as of a tape recorder and more particularly to a device for automatically and mechanically effecting the shutting off of a tape transport mechanism through detection of stops of tape transport members such as reel beds or idlers upon completion of tape transport or feeding in forward or reverse directions of a tape, which device is capable of effectively performing automatic shut-off during tape transport at a high speed.

SUMMARY OF THE INVENTION

It is an object of the present invention to provide an automatic shut-off device wherein a driven rotary body such as a fly-wheel, which is directly connected to a drive source, is associated with a detecting wheel adapted to normally rotate conjointly with said rotary member to convey the rotation to a tape transport member such as a reel bed or an idler and cause displacement in a rotational sense with the drive rotary member by a load applied due to stopping of the tape transport member upon the completion of tape transport, and a locking member keeping the tape running is adapted to be released, upon the rotational displacement of the detecting wheel, by a release actuating member associated with the drive rotary member.

It is anothr object of the present invention to provide an automatic shut-off device wherein a detecting wheel is connected to a rotary drive member under a highly-loaded condition during the feeding of a tape and which is adapted to be immediately disconnected from said rotary member when a heavy load is applied to said detecting wheel due to stopping of tape transport members upon completion of the tape feeding, thereby to race said drive rotary member without exerting a brake action by said detecting wheel on said rotary member, The invention is effective for keeping the original powerful rotation of said rotary member effectively and effecting a releasing of a locking member accurately, as well as overcoming possible shortages in power of said drive rotary member due to possible voltage drop. The invention is also adapted for permitting employment of a motor of small capacity as a drive source and promoting saving of electric power consumption.

It is a further object of the present invention to provide an automatic shutting-off device wherein a release actuating member for a locking member is kept in a retracted position so as not to collide against said locking member during the feeding of a tape and is to project when required, to prevent unintentional or inadvertent actuation of the locking member into the release actuating position, and wherein said release actuating member is composed of a biasing member and a kick-out member whereby the locking member is displaced into the release actuating position by said biasing member which is in turn released by said kicking-out member moved conjointly with a rotary drive member to let said biasing member retract simultaneously for automatic resetting into a standby position for further operation.

It is a still further object of the present invention to provide an automatic shut-off device which is capable of being formed so compactly that it is substantially of a size and a thickness of a fug-wheel, because of its specified coaxial arrangement, thereby to save a space therefor in a tape recorder etc.

It is a still further object of the present invention to provide an automatic shut-off device wherein a rotary drive member and a detecting wheel are connected through a torsion spring coil and a clutch and the engagement of the clutch is rotationally improved to overcome possible disadvantages due to a construction such that a spring to be employed is not strong because a strong spring applies a load torque and exerts undesirable effect upon release of the clutch, thus enabling a strong spring to be employed and the clutch to operate accurately.

It is a still further object of the present invention to provide an automatic shut-off device wherein a kick-out member is adapted to depress a biasing member irrespective of the engaging position of said biasing member and a control member, in a position wherein said kick-out member is rotationally displaced by play with reference to the drive rotary member, wherein the biasing member is positively depressed to be reset, irrespective of the position of the kick-out member for kicking and releasing said locking member when the kick-out member is pushed back upon collision against a locking member.

It is a still further object of the present invention to provide an automatic shut-off device wherein a detecting wheel provided coaxially with a drive rotary member has an annular rib at its inner periphery concentric therewith and the rib is adapted to abut upon and be borne by, at its outer periphery, said drive rotary member, thereby to eliminate possible lag caused therebetween and possible disorder concerning the operation period of a clutch caused by such lag.

It is a still further object of the present invention to provide an automatic shut-off device as mentioned above wherein the outside of a detecting wheel is borne by a roller member provided in a rotary drive member, thereby to reduce frictional resistance at the bearing portion between said drive rotary member and the detecting wheel, assuring smooth rotation.

It is a still further object of the present invention to provide an automatic shut-off device as mentioned above wherein the contact between a roller member and a detecting wheel is made more tightly through resilient means, thereby to minimize noise possibly produced between said roller member and said detecting member.

BRIEF DESCRIPTION OF THE DRAWING

FIGS. 4 and 5 are horizontal sectional views showing operative states of the device of FIG. 1;

FIG. 13 is more particularly a sectional view taken along line A—A of FIG. 11;

FIG. 14 is more particularly a similar sectional view taken along line B—B of FIG. 11;

FIG. 15 is more particularly a sectional view taken along line C—C of FIG. 12; and FIG. 16 is more particularly a plan view showing an elongated leg of a main clutch member positioned on certain convex portions after disengagement from other concave portions;

FIG. 18 is an explanatory view showing a cause of possible misoperation of a biasing member;

FIG. 19 is an explanatory view showing a counter measure against such misoperation;

FIG. 20 is a perspective view of the apparatus of FIG. 19;

DETAILED DESCRIPTION

According to the present invention, there is provided an automatic shut-off device for use with a tape recorder which consists essentially of a rotary drive member such as a fly-wheel connected directly to a drive source. A detecting wheel is mounted coaxially with said rotary drive member and is adapted to connect with a tape transport member such as an idler on a reel bed, conveying rotation, as well as detect a load caused due to stopping of said tape transport member upon the completion of the tape transport and cause rotational displacement in relation with said drive rotary member due to said load. A lock release actuating member is provided in association with said drive rotary member and is adapted to release a locking member in a position to keep the tape transporting, according to said rotational displacement.

Figure 1:
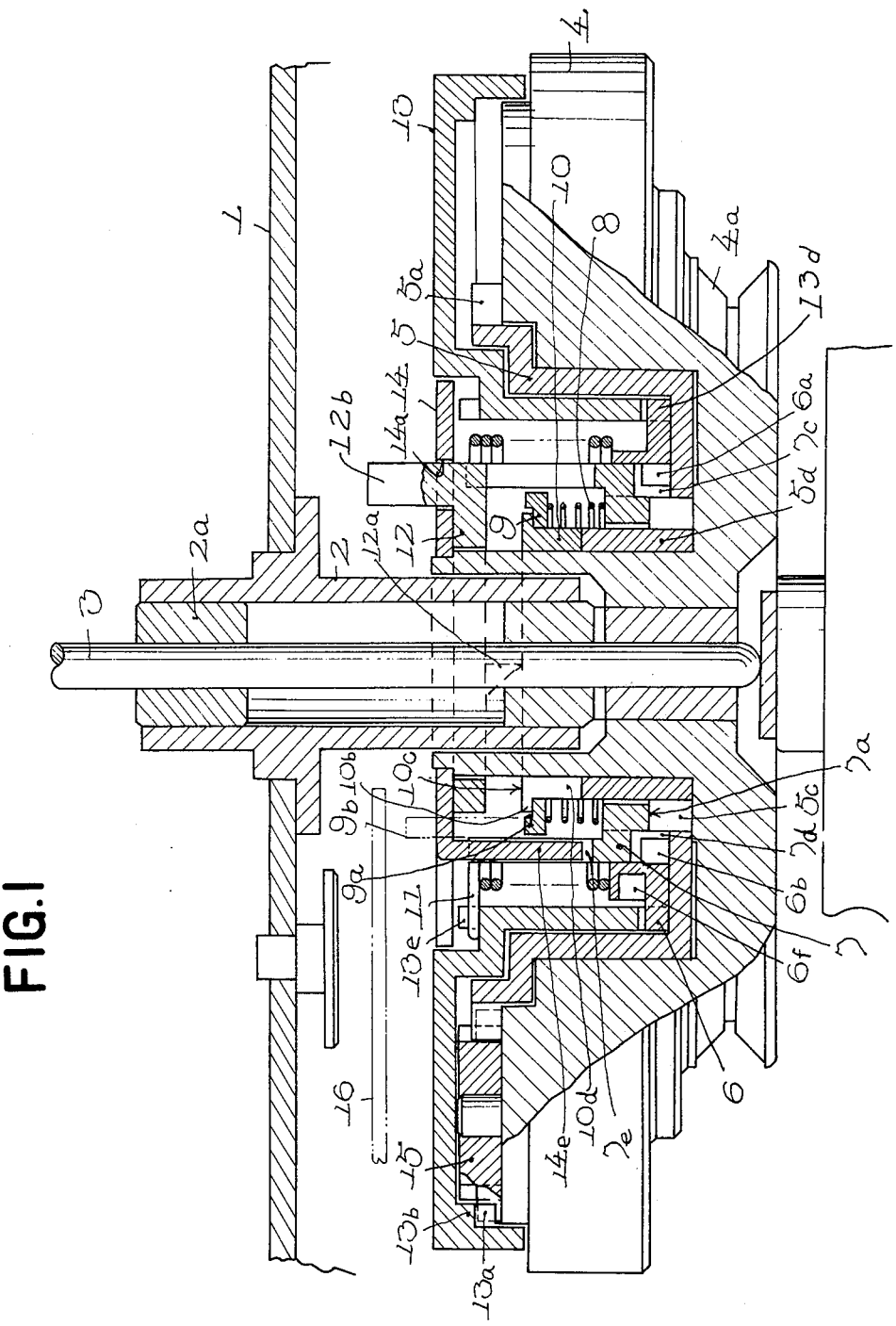
FIG. 1 is a vertical sectional view of a main portion of one form of an automatic shut-off device according to the present invention.
Figure 2:
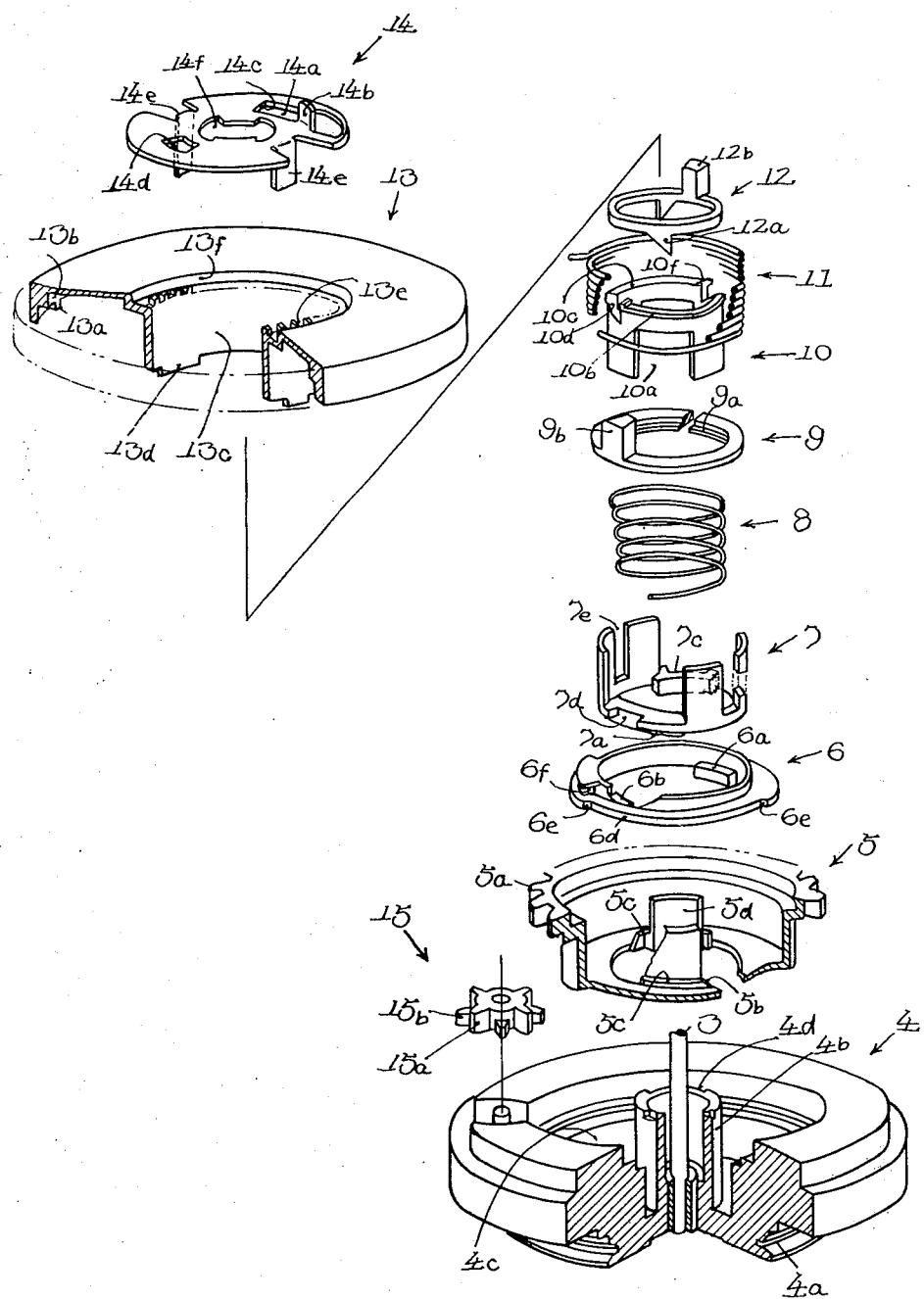
FIG. 2 is an exploded view of the device of FIG. 1.

In FIG. 1, there is shown a frame 1 of a tape recorder to which a hollow cylindrical shaft 2 is fixed. A bearing bushing 2a is fitted in and fixed in said shaft 2. Said bushing 2a rotatably bears a capstan shaft 3. To said capstan shaft 3 is fixed a fly-wheel 4 or a rotary drive member which has a pulley portion 4a formed integrally therewith. Said pulley portion 4a is connected, through a belt (not shown), to a motor or a drive source. On said fly-wheel 4, there are mounted, as shown in FIG. 2, a transmission member 5, an auxiliary clutch member 6, a main clutch member 7, a coil spring 8, a biasing member 9, a control member 10, a torsion coil spring 11, a kick-out member 12, a detecting wheel 13, an actuating disc member 14 and a pinion 15.

The fly-wheel 4 has an annular concave portion 4c around and concentric with a base portion 4b formed centrally thereon. In said concaved portion 4c is rotatably fitted the transmission member 5 of cup-like shape which is formed to conform to said concave portion 4c. Said transmission member 5 is formed with a gear 5a on the periphery of its upper portion. Said gear 5a is adapted to mesh with the pinion 15 which is mounted on the fly-wheel 4 at its concentric position. The pinion 15 is adapted to be rotated intermittently by meshing with a tooth 13a provided on the inside of the detecting member 13. The pinion 15 has alternating long and short teeth 15a and 15b. Both of said long and short teeth 15a and 15b are always kept in mesh with gear 5a of the transmission member 5 as mentioned in detail later, referring to its operation, while only the short teeth 15b are adapted to be in mesh with the tooth 13a of the detecting member 13. When said short teeth 15b are in a position as shown in FIG. 4 wherein said short teeth 15b are not in mesh with said tooth 13a, the long teeth 15a adjacent said short teeth 15b slide on an annular protuberance 13b provided on the detecting member 13 at a position higher than said tooth 13a. Thus, the pinion 15 is not rotated in such circumstances.

The transmission member 5 is provided with two cams 5c having slanting portions 5b at their respective forward ends, which are formed centrally at equal distances in the circumferential direction so as to stand up and are adapted to release the clutch. Said cams 5C have a stroke of a certain length to keep a period of released state for the time during which the fly-wheel 4 rotates several times. The slanting portion 5b of the cam 5c is adapted to abut upon and is allowed to push up associated slanting portion 7b of cam 7a which is formed on a lower surface of the main clutch member 7 accommodated in and supported by the transmission member 5. The cam 7a is formed at two positions spaced equally in the circumferential direction and has a stroke of the same length as the cam 5c. The main clutch member 7 has a long and short cut-out clutch engaging portion 7c and 7d which are adapted to removably engage a long and short protuberance 6a and 6b respectively of the auxiliary clutch member 6 accommodated in and supported by an inner hollow portion of the transmission member 5.

The control member 10 formed as an annulus is rotatably fitted around the boss portion 4b of the fly-wheel 4. Said control member 10 is formed at the periphery thereof with a vertical cut-out portion 10a which is adapted to engage with a projection 5d formed on the transmission member 5 to convey rotation from said transmission member 5 to the control member 10.

Said control member 10 is formed with a flange 10b extending outwardly at its upper end portion. Said flange 10b is adapted to abut upon and be supported by a stepped portion 9a formed on the inside of the biasing member 9 formed as a ring and fitted around said control member 10. The coil spring 8 is mounted between a lower surface of the biasing member 9 and the main clutch member 7 to urge the engagement of the clutch members and projection of the biasing member 9 and the control member 10. An upper face of said flange 10b of the control member 10 acts as a depressing actuator face 10c and is formed with a cam concavity 10d with a stroke of a certain length for controlling the projection time of the biasing member 9. The cam concavity 10d is provided with a follower projection 10f which is adapted to engage with a cam leg 12a of the kick-out member 12 to follow the kick-out member 12.

Said kick-out member 12 is further provided with a projection 12b formed to project upwardly and is adapted to strike and push out a locking member as mentioned later. Said projection 12b is adapted to extend always through an elongated slot 14a formed on the actuating disc member 14 in the circumferential direction. Said elongated slot 14a is provided with a projection 14b. The distance between said projection 14b and one end 14c of said elongated slot 14a is predetermined to have a certain length of stroke for an operation explained later.

Said biasing member 9 has a projection 9b for displacing the locking member into a release actuating position upon striking of said locking member. Said projection 9b is fitted in another slot 14d of the actuating member 14 only for receiving said projection 14, extending a little therethrough.

The actuating member 14 has centrally an engaging slot 14e which is formed so as to conform to an engaging portion 4d formed on the boss 4b of the fly-wheel 4 and is adapted to be forcibly fixed thereinto for conjoint movement. Said actuating member 14 further has a follower leg 14e which is formed to extend downwardly. The follower leg 14e is adapted to removably engage with a cutout 7e formed on the main clutch member 7 with its upper end operated. A stopper 13d is formed on a lower end of a barrel portion 13c of the detecting wheel 13 and is adapted to be positioned in a rotation-allowing cutout 6d formed on a periphery of the auxiliary clutch member 6. Said cutout 6d has, at its both ends, portions 6e for controlling said stopper 13d. The auxiliary clutch member 6 and the detecting wheel 13 have spring holder 6f and 13e, respectively, to which a torsion coil spring 11 tightly wound is secured at its ends, respectively, to couple said auxiliary clutch member 6 and said detecting wheel 13. In this connection, it is to be noted that the spring holder 13e of the detecting wheel 13 is formed of a plurality of teeth like a gear to freely select the position for holding the spring, thereby enabling the tension of said torsion coil spring 11 to be adjusted as desired.

Figure 3:
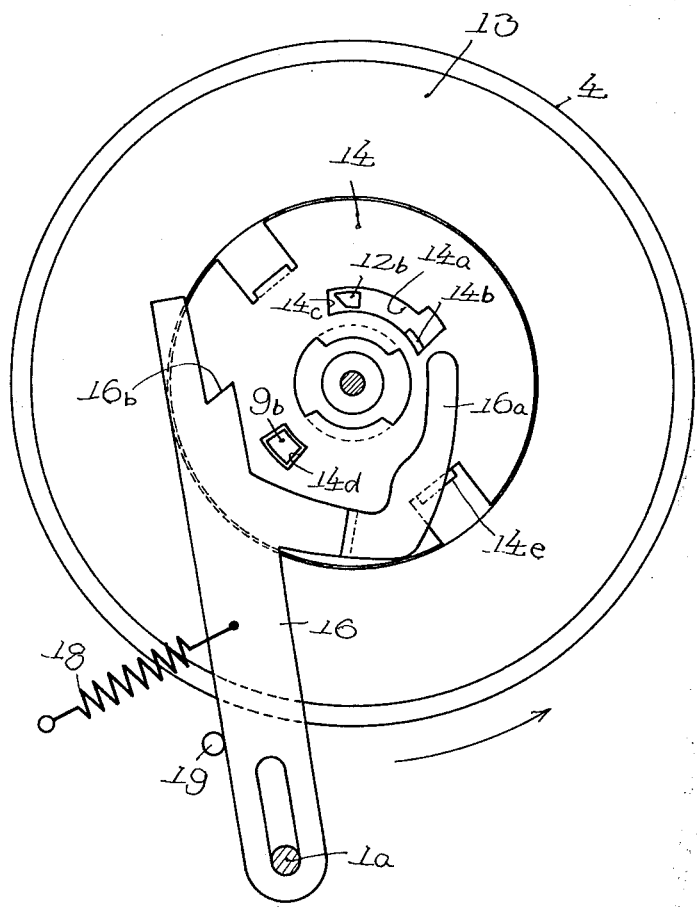
FIG. 3 is a plan view of the device of FIG. 1.

The locking member 16 for keeping a tape running after it has been actuated by the projection 12b is, as shown in FIG. 3, held so as to move in the axial direction by a shaft 1a formed on the frame 1 and urged in one direction by a spring 18, while the vibration thereof is controlled by a stopper 19. Said locking member 16 is positioned above the actuating member 14 and provided with an arm portion 16a operative by the projection 9b at its one end and kick-out portion 16b operative by a projection 12b at its other end. The movement of the locking member 16 in the axial direction releases an engaging plate of a push button (not shown).

In the embodiment shown in FIG. 1, the bearing of the detecting wheel 13 is not effected by fitting the barrel portion of the detecting wheel 13 to the inner periphery of the transmission member 5, but said detecting wheel 13 is borne through abutment of an annular recessed face and the circumferential periphery of the actuating member 14.

The operation of the thus constructed automatic shut-off device is as follows:

When the fly-wheel 4 is rotated counterclockwise for transport of a tape, the members of the present automatic shut-off device are rotated conjointly with the fly-wheel 4. Illustratively stated, the main clutch member 7 is first rotated because of the engagement between the follower leg 14e of the actuating member 14 which is fixed to the flywheel 4 and the cutout 7e of the main clutch member 7. The auxiliary clutch member 6 is then rotated conjointly with said main clutch member 7 since the clutch engaging portions 7c and 7d of the main clutch member 7 is engaged with projections 6a and 6b of the auxiliary clutch member 6, respectively. The detecting wheel 13 is further rotated owing to the connection between said auxiliary clutch member 6 and said detecting wheel 13 through the torsion coil spring 11 to frictionally rotate a tape transport member such as a reel bed, or an idler connected to said reel bed (not shown).

Figure 6:
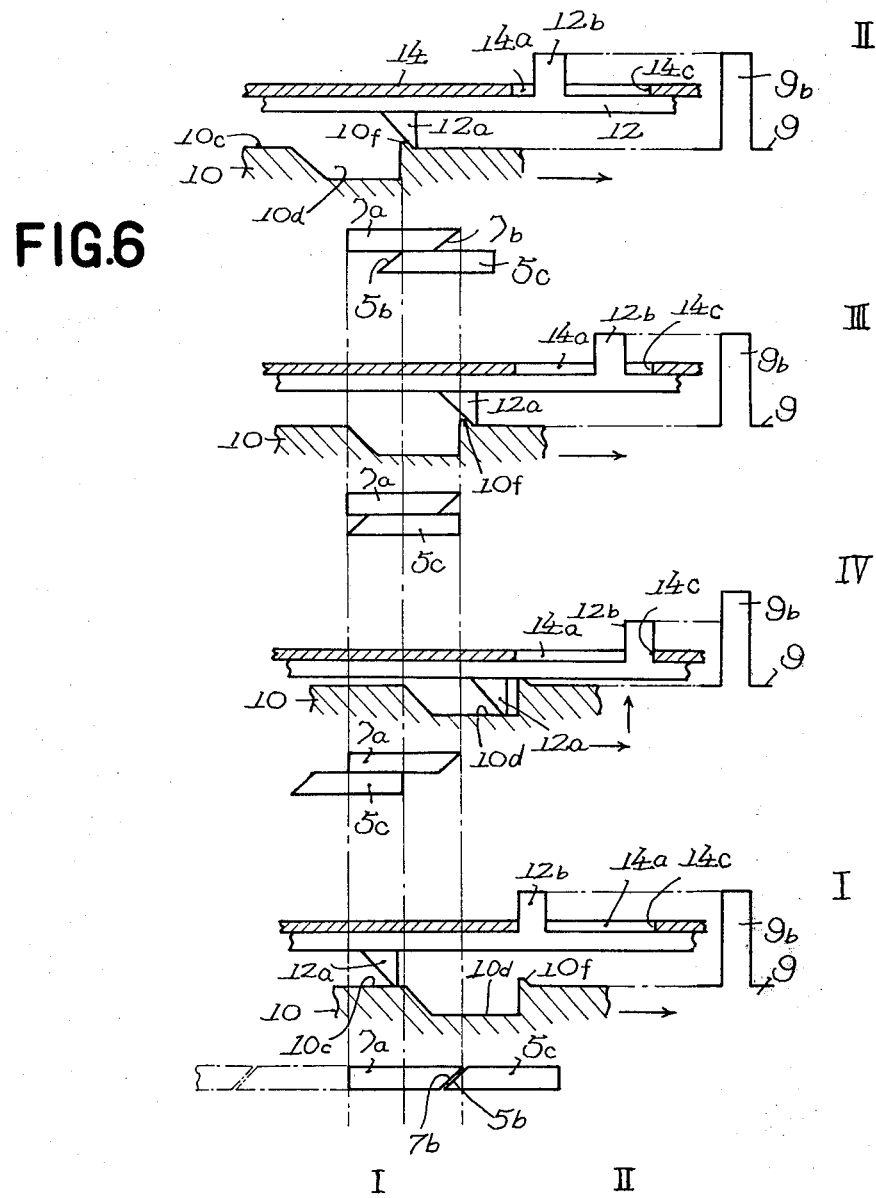
FIG. 6 is a diagrammatic view showing the relationship between the racing operation of a fly-wheel and projection timing of a biasing member.

As depicted in FIG. 6 (I), the slanting portion 5b of the cam 5c of the transmission member 5 is adapted to abut upon a slanting portion 7b of the cam 7a of the main clutch member 7 to allow it to be pushed upwardly.

The cam leg 12a of the kick-out member 12 abuts upon the depressing face 10c of the control member 10 as shown in FIGS. 1 and 6(I) to suppress the projecting urge of said control member by the coil spring 8. Accordingly, in this position, the biasing member 9 which is associated with said control member 10 so as to follow the projecting movement thereof is in a compressed state and the projections 9b of said biasing member 9 which is engaged with the slot 14d of the actuating member 14 as shown in FIG. 1 is in a retracted position where it does not abut upon the locking member 16.

Under a light-loaded condition during the rotation of the members or during the tape transportion, the piniion 15 is in mesh only with the gear 5a of the transmission member 5 as shown in FIG. 4 and kept in a position where it is not in mesh with the tooth 13a of the detecting wheel 13, or in a position lagged by a rotation angle of $\alpha°$. In this state, the pinion 15 has its long teeth 15a adjacent the short teeth 15b astride the annular protuberance 13a of the detecting wheel 13, preventing the rotation of the pinion 15.

The lag of $\alpha°$ as mentioned above is retained through the abutment of the stopper 13d of the detecting wheel 13 upon the control portion 6e of the auxiliary clutch member 6 as shown in FIG. 4. This abutment is effected by the torsion coil spring 11.

In the positional relationship among the members as mentioned above, the tape transport is effected. Upon completion of the tape transport, a heavy load is applied to the detecting wheel 13 due to the halting of the tape transport members, thereby to stop said detecting wheel 13 while the fly-wheel 4 continues to rotate. Therefore, said detecting wheel 13 is relatively displaced with reference to the fly-wheel 4 or the auxiliary clutch member 6 by more than $\alpha°$ by expanding the coil spring 11. The short teeth 15a of the pinion 15 are then brought into mesh with the tooth 13a of the detecting wheel 13 in a halted position as shown in FIG. 5. The pinion 15 is rotated by two teeth in the present embodiment and the transmission member 5 in mesh with said pinion 15 is intermittently advanced by a predetermined distance. As a result, the slanting portion 5b of the cam 5c of the transmission member 5 presses the slanting portion 7b of the cam of the main clutch member 7 in a facing relation therewith, to bring the cam 7a onto the cam 5a as depicted in FIG. 6 (II) from a position abutting upon each other as shown in FIG. 6 (I). The main clutch 7 integral with said cam 7a is then forcibly raised against the action of the coil spring 8 and the clutch engaging portions 7c and 7d thereof are disengaged from the projections 6a and 6b of the auxiliary clutch member 6 to release the clutch and race the fly-wheel 4.

On the other hand, upon the release of the clutch, the auxiliary clutch member 6 is instantaneously returned by the action of the torsion coil spring 11 until the control portion 6e thereof collides against the stopper 13d of the detecting wheel 13. The cam 7c is forced to ride over the cam 5c while the fly-wheel 4 races several times (three times in the present embodiment), preventing the clutch from being thrown in during this time.

The fly-wheel 4, the rotation force of which is once reduced, again restores its rotation force rapidly owing to its racing to cause the following operation. Stated illustratively, the transmission member 5 is intermittently rotated every engagement of the pinion 15 with the tooth 13a by the racing of the fly-wheel 4 due to the release of the clutch, and the control member 10 is also rotated intermittently through said transmission member 5 since there upstanding portion 5d thereof is engaged with the cutout 10a of the control member.

According to the intermittent rotation of the control member 10 through the transmission member 5, the cam leg 12a of the kicking-out member 12 positioned on the depressing face 10c of said control member 10 is hooked by the follower projection 10f formed on the depressing face 10c and the kick-out member 12 is intermittently moved conjointly with the control member 10. Upon this movement of the kick-out member 12, the projection 12b thereof moves within the slot 14a formed on the actuating members 14 according to the steps as shown in FIG. 6(II)–(III) and further moves to a position of the step as shown in FIG. 6 (IV) upon further intermittent feeding of the control member 10, where said projection 12b collides against the one end 14c of the slot 14a to prevent its movement. Accordingly, the cam leg 12a is disengaged from the follower projection 10f and falls into the cam concavity 10d, so that the control member 10 depressed by said cam leg 12a is pushed upwardly together with the biasing member 9 by the coil spring 8. The projection 9b of the biasing member 9 extends more through the slot 14d to collide against the locking member 16 at its arm portion 16a as shown in FIG. 4 so that the kick-out portion 16b of said locking member 16 is positioned in the course of the movement of the projection 12b. When said projection 12b collides against the kick-out portion 16b, said portion 16b pushes said projection 12b from the one end 14c of the slot 14a to the projection 14b, where said projection 14b controls the displacement of said projection 12b thereby to effect a conjoint movement of said projection 12b and the actuating member 14 for kicking out the locking member 16. Said locking member 16 thus kicked out releases the engaging plate of the push button device to automatically shut off the mechanism.

Upon the kick-out and the release by the locking member 16, the cam leg 12a is disengaged from the cam concavity 10d and restored onto the depressing surface 10c, thereby to depress the control member 10 and let the projection 9b of the biasing member 9 retreat for a further tape transport.

In the operation mentioned above, it is to be noted that in a position where the projection 12b projects just beneath the arm portion 16a of the locking member 16, it is impossible to bias said locking member 16. In order to prevent this, the stroke of the cam concavity 10d wherein said cam leg 12a moves is made long enough to keep said projection 12b in a projected state for a time during which the fly-wheel 4 rotates for example two times in the present embodiment.

After the operation has been stopped, when the motor is driven, only the fly-wheel 4 is rotated and the main and the auxiliary clutch member are still in the released position, so that the detecting wheel does not immediately start its rotation. Illustratively stated, when the fly-wheel 4 is rotated, the transmission member 5 is driven through the pinion 15 which is in mesh with the tooth 13a of the detecting wheel 13, the cam 7a is disengaged from the cam 5c and the long and the short projections 6a and 6b are brought into engagement with the clutch engaging portions 7c and 7d, respectively, the clutch is thrown in and the rotation of the fly-wheel 4 is conveyed to the detecting wheel 13 to start the tape transport.

In the foregoing embodiment, the clutch engaging portions 7c and 7d of the main clutch member 7 are engaged with the projections 6a and 6b of the auxiliary clutch member 6 and the clutch is disengaged by pushing up the cam 7a of said main clutch member 7 with the cam 5c of the transmission member 5. In the thus constructed device, however, to the fly-wheel 4 are applied, when the tooth 13a of the detecting wheel 13 makes the transmission member 5 rotate through the pinion 15, a torque caused by the torsion coil spring 11 and a torque for the release of the clutch as mentioned above. Therefore, the torsion coil spring 11 is preselected so as to be sufficiently weak in view of the clutch releasing torque and it can not effectively act to absorb undesirable shock during the tape transportation.

In this connection, it is to be noted that it is prescribed that a torque for taking up the tapes is to be 60 g/cm or less at a reel shaft. The torque for releasing the clutch between the fly-wheel and the detecting wheel must be selected to be greater according to the necessity of rotating the tape transport members such as a reel bed and so forth by the fly-wheel through the detecting wheel in the forgoing embodiment. The lowest limit of the clutch releasing torque is thus determined.

Figure 7:
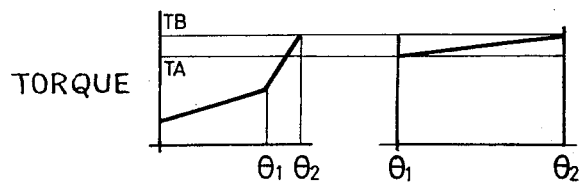
FIG. 7 (I) and (II) is a diagrammatic view showing characteristics of torque for releasing a clutch.
Figure 8:
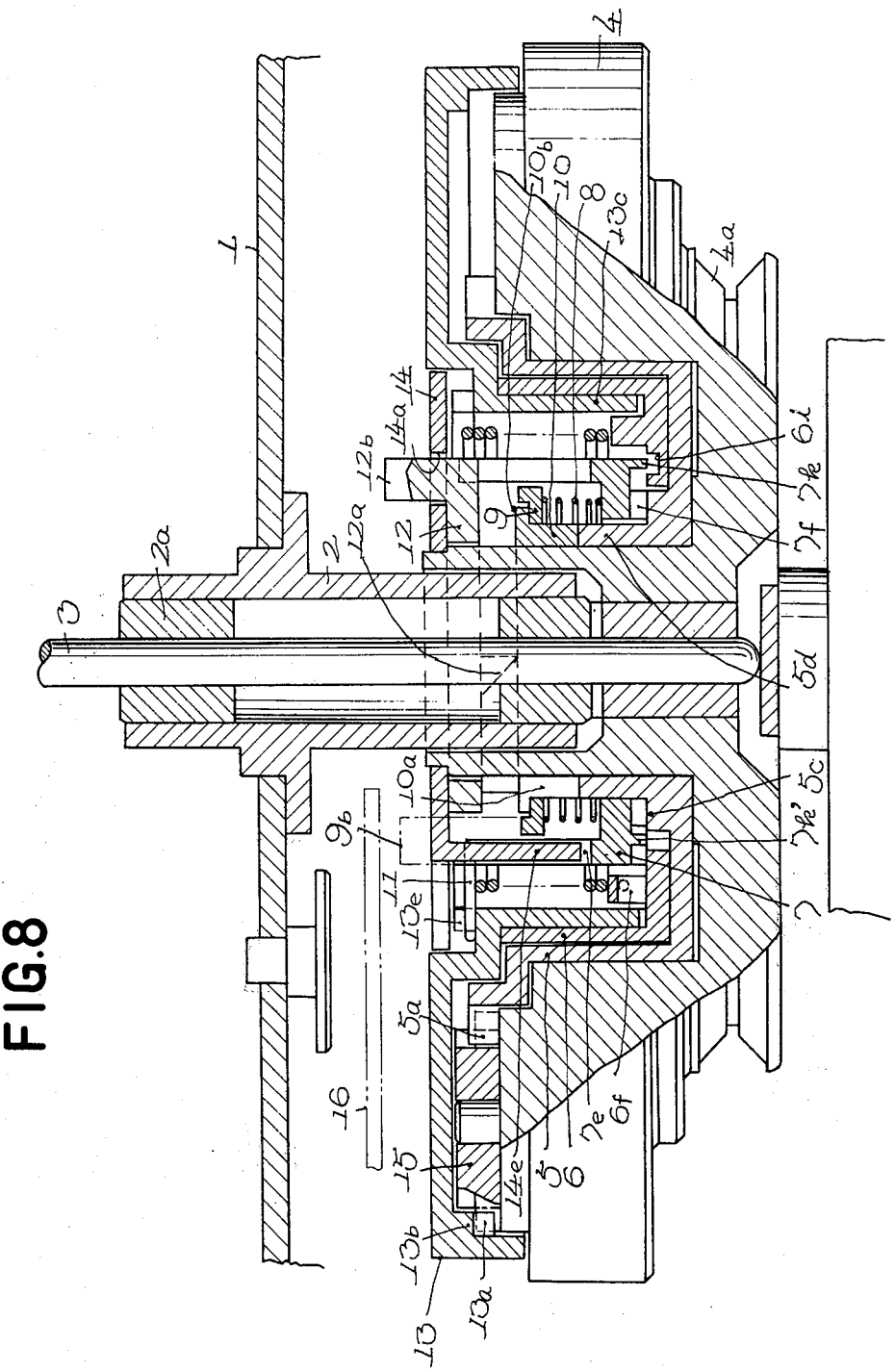
FIGS. 8 to 17 show another form of an automatic shut-off device according to the present invention wherein a clutch itself is provided with a bias for disengagement.
Figure 9:
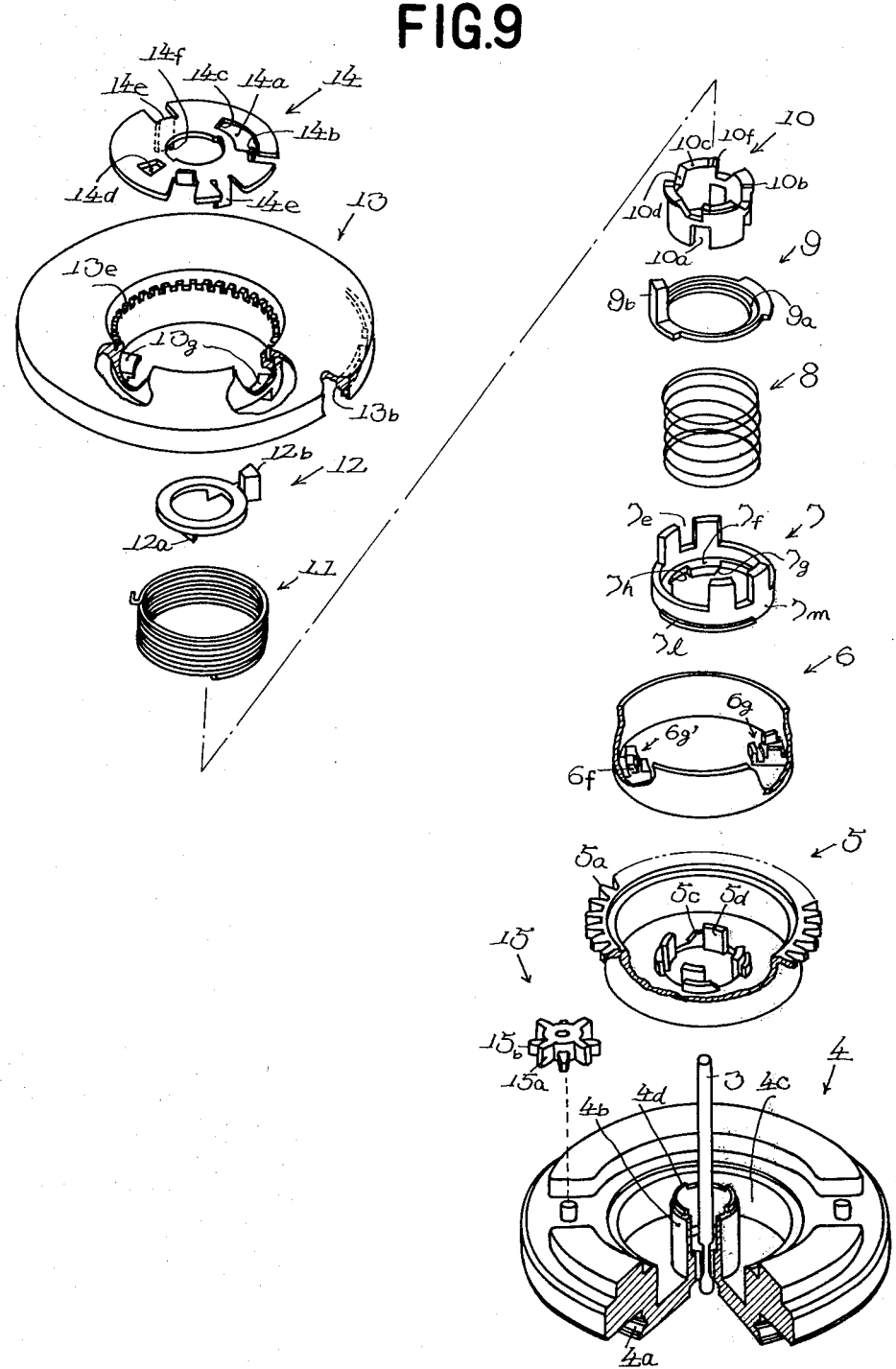

Next, assuming that the tape transport torque is TA as shown in FIG. 7 (I), the amount of slippage or displacement between the fly-wheel and the detecting wheel during the tape feeding is $\theta_1$. In other words, the $\theta_1$ is an essential displacement for the tape feeding. However, in case the torque exceeds in a moment the uppermost limit TB corresponding to the displacement $\theta_2$ which causes the release of the clutch, at the start of the tape feeding or during the tape feeding, the clutch is unintentionally released because of the small difference between $\theta_1$ and $\theta_2$.

In this context, another embodiment is shown in FIGS. 8 to 17 which is essentially identical with the foregoing in the number of members, structures and operations and differs therefrom in details of a main clutch member 7, an auxiliary clutch member 6 and a detecting wheel 13. Accordingly, the explanation of the present embodiment is given referring to the difference therebetween. Like numerals are applied to like members and portions and new numerals are used only to designate new members and portions.

In FIGS. 8 to 17, the main clutch member 7 is provided with a plurality of salient cams 7f having respective operating surfaces at their respective bottom surfaces and formed at the inner lower portion of said main clutch member 7 at equal intervals in the circumferential direction. Each of the salient cams 7f has a slanting portion 7g at one end. Between the respective salient cams 7f there are formed gaps 7h into which cams 5c formed on a transmission member 5 are inserted. A slanting portion of each of the cams 5c is adapted to abut upon said slanting portion 7g. Said main clutch member 7 is further provided with cutouts 7i and 7i' at its bottom at positions opposed to each other in the diametrical direction. In the thus formed cutouts are respectively inserted projections 6g and 6g' formed on the auxiliary clutch member 6 at its inner lower portion. Each of said projections has a slanting portion 6h upon which said slanting portion 7j formed at the one end of the respective cutouts 7i and 7i' is adapted to abut, thereby to normally urge the main clutch member 7 to disengage from the auxiliary clutch member 6.

Figure 16:
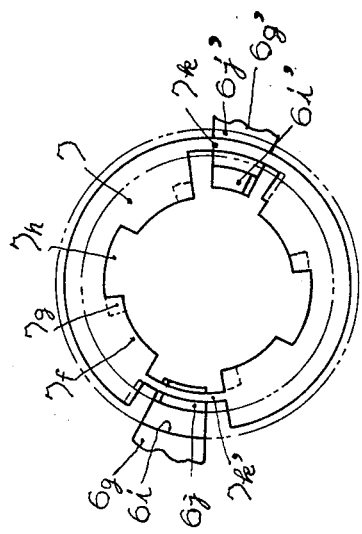
Figure 17:
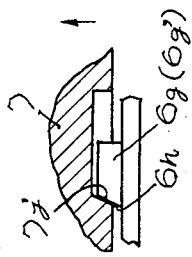

There are, as shown in FIG. 16, formed concave portions 6i and 6i' and convex portion 6j and 6j' on an upper surface of each of the projections 6g and 6g'. Said concave portions 6i and 6i' and said convex portions 6j and 6j' have a difference therebetween in lengths in the radial direction and are arranged to be concentric. On these portions are positioned elongated legs 7k and 7k' formed on the bottom surface of the main clutch member 7 and having a difference therebetween in length in the radial direction. When the main clutch member 7 is displaced by 180°, the elongated legs 7k and 7k' exchange their positions on the concave portions 6i and 6k' and the convex portions 6j and 6j'.

Said main clutch member 7 is further formed with two engaging flanges 7l at required positions, defining disengaging gaps 7m therebetween. The engaging flanges 7l are adapted to engage with elongated control slips, respectively, through the respective disengaging gaps 7m.

The projection 6g' is provided with a spring holder 6f to which a torsion coil spring 11 carried at its one end by a spring holder 13e of the detecting wheel 13 is fixed at its other end.

Figure 11:
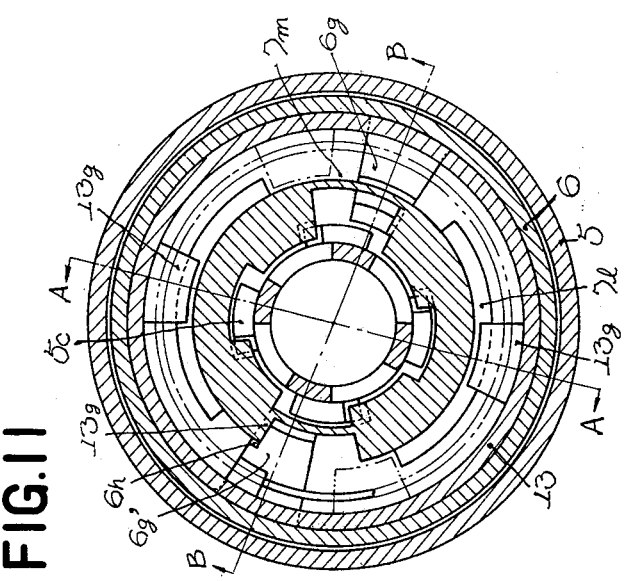
Figure 14:
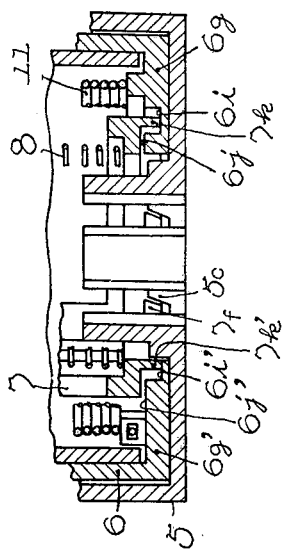
Figure 10:
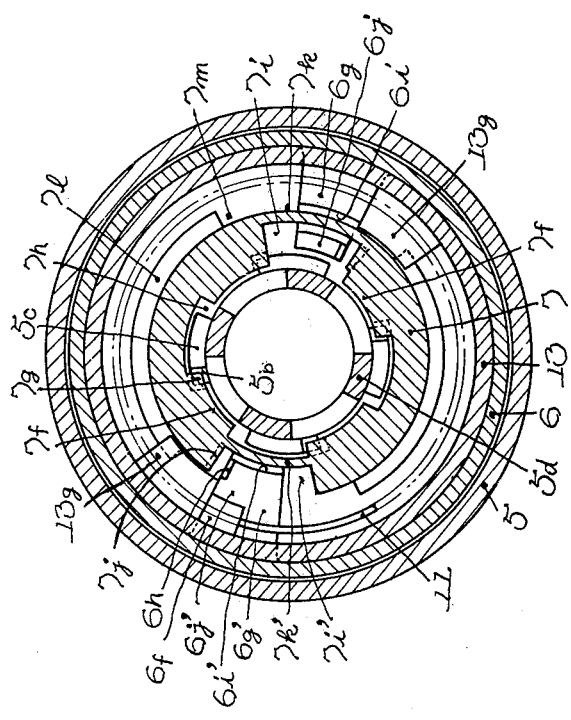
Figure 13:
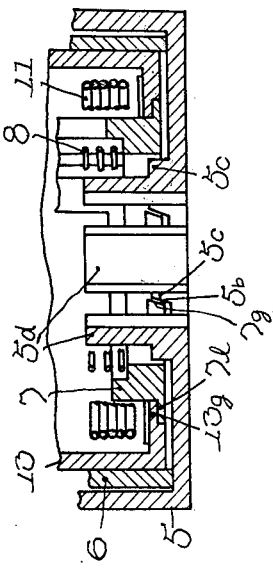

The gist of the operation is given in the following:

During the tape feeding or tape transportation, the main clutch member 7 is connected to an actuating disc member 14 which is fixed to the fly-wheel 4, the slanting portion 7j of said main clutch member 7 comes to abut upon the slanting portion 6h formed on the projections 6g and 6g' of the auxiliary clutch member 6 from the position of FIG. 10 to the position of FIG. 11 and the main and the auxiliary clutch member 7 and 6 are kept in engagement with each other since the control portion 13g of the detecting wheel 13 is positioned above the engaging flange 7l of the main clutch member 7, preventing the main clutch member 7 from being raised.

Figure 12:
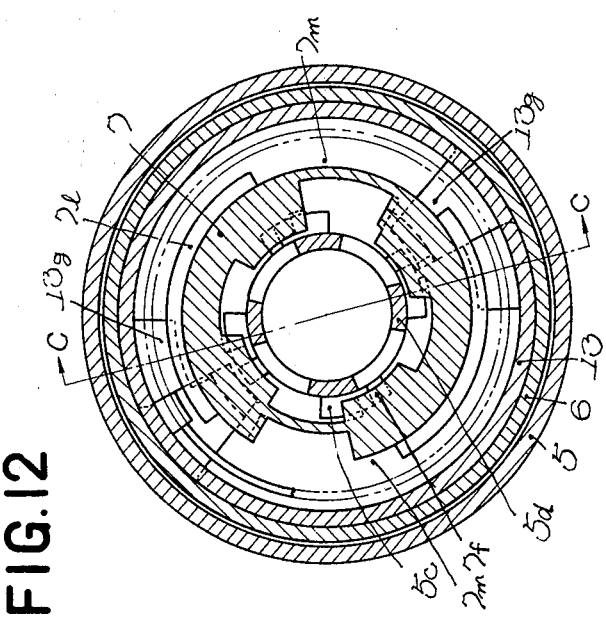
Figure 15:
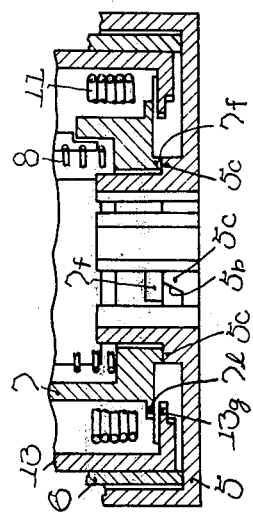

Upon the completion of the tape feeding, a load is applied to the detecting wheel 13 to halt the rotation of said detecting wheel 13 while the by-wheel 4 and the main clutch member 7 continue to rotate. This rotation causes the disengaging gap 7m of the main clutch member 7 to reach a position of the control portion 13g in a halted state as shown by a dotted line in FIG. 11, wherein the control portion 13g is shown to be positioned in the disengaging gap 7m upon relative rotation of the detecting wheel 13, and the main clutch member 7 is raised by itself through the rotation of the fly-wheel 4 against the action of the coil spring 8 since the slanting portion 7j of the main clutch member 7 normally abuts upon the slanting portion 6h of the auxiliary clutch member 6 to be raised thereby. As a result, the engaging flange 7l of the main clutch member 7 is positioned on the control portion 13g of the auxiliary clutch member 6 as shown in FIG. 12 to disengage the main and the auxiliary clutch member from each other, and race the fly-wheel 4. Upon the release of the clutch, the auxiliary clutch member 6 is quickly moved by the action of the torsion coil spring 11 until its projections 6g and 6g' are stopped by the one end of the control portion 13g of the detecting wheel 13. On the other hand, the fly-wheel 4 is raced and the pinion 15 is brought into engagement with the tooth 13a to intermittently drive the transmission member 5. The cam 5c of said transmission members 5 readily enters below the bottom of the salient cam 7f of the main clutch member 7 which has been already raised, through the slanting portions 7g and 5g, thereby to maintain the racing of the fly-wheel 4. In the foregoing embodiment, the cam 5c acts to release the clutch and maintain the racing of the fly-wheel 4, whereas in the present embodiment, it acts only to maintain the racing of the fly-wheel 4.

As far as the elongated legs 7k and 7k' are not in a position to fall in the concave portions 6i and 6i' but in a position to ride on the convex portions 6j and 6j', as shown in FIG. 16, the main clutch member 7 is kept in a raised position, leaving the clutch released.

In the present embodiment, the releasing of the clutch is effected by the rotating force of the main clutch member 7 without utilizing the torque of the torsional coil spring 11. Owing to such construction, it is possible to make larger the difference between the essential displacement $\theta_1$ during normal tape transport and the displacement $\theta_2$ to effect clutch releasing. As a result, it becomes possible to make the angle of $\alpha$ between the pinion 15 and the tooth 13a larger, thereby to solve the problem that the clutch is possibly released when not required.

A further embodiment of the present invention is also illustrated. In the position shown in FIG. 6 (III) wherein the projection 12b of the kick-out member 12 is positioned in the slot 14a at a position intermediate the ends and the cam leg 12a is engaged with the follower projection 10f, if some external force is applied to the projection 12b to disengage said cam leg 12a from the follower projection 10f, the projection 9a of the biasing member 9 is undesirably projected, so that it becomes impossible for the projection 9a to retreat by the projection 12b of the kick-out member 12 (see FIG. 18).

In order to eliminate this problem, the biasing member 9 is provided with a receiving portion 9c and the kick-out member 12 is provided with another cam leg 12c for pressing said receiving portion 9c as shown in FIGS. 19 and 20. Said cam leg 12c is adapted to align with said receiving portion 9c and the biasing member 9 is pressed into the resetting position through the pressing of said cam leg 12c against said receiving portion 9c when the projection 12b of the kick-out member 12 is displaced to another end 14c of the slot 14a.

A still further modification is not given below. For example, in the structure shown in FIG. 1, the detecting wheel 13 is formed with the annular concave portion 13f and borne by the outer periphery of the actuating member 14 fixed to the by-wheel 4, and there is a relationship $$TLd_1 < TLd_2$$

where $d_1$ is a diameter of the actuating member 14 and $d_2$ is a diameter of the opening of the detecting wheel 13.

After the actuating member 14 has rotated n times, the detecting wheel has, in relation with said actuating member 14, a lag $$nTL(d_2-d_1).$$

This lag will cause the rotational angle $\alpha°$ predetermined as shown in FIG. 4 to be gradually decreased and finally release the clutch after the tape is played many times.

In order to eliminate these troubles, it is proposed that the detecting wheel 13 be borne on its outside. Stated illustratively, in this proposed structure, the detecting wheel 13 tends to gain upon the actuating member 14 and the rotational angle $\alpha°$ in FIG. 4 in increased. This tendency is very effective in view of the fact that it increases torque for releasing the clutch.

Figure 21:
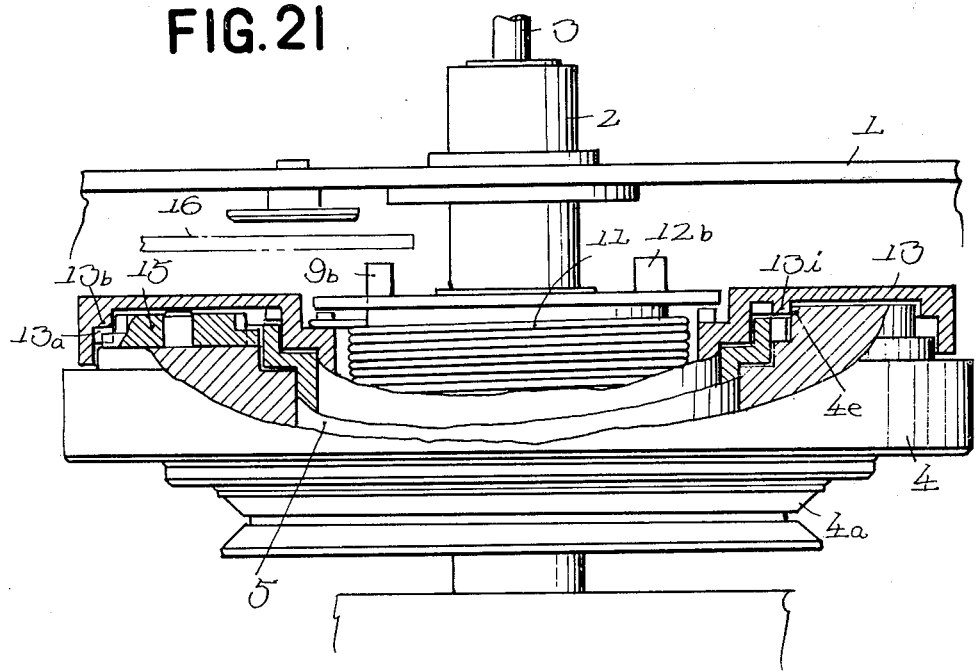
FIG. 21 is a partially cut out side elevational view showing a detecting wheel borne at its outside by a fly wheel.
Figure 22:
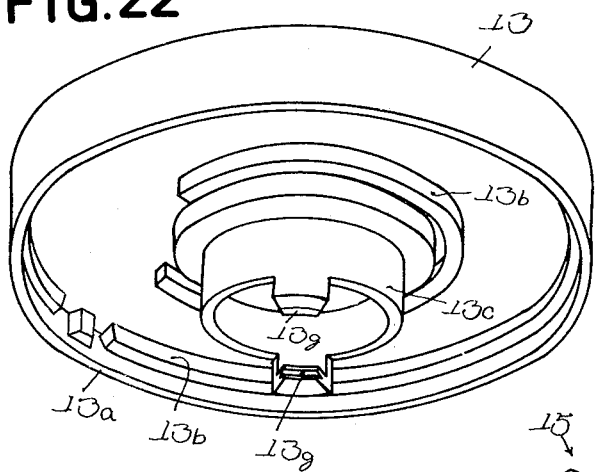
FIG. 22 is a perspective view of the detecting wheel.

An example of the structure where the detecting wheel 13 is borne on its outside is shown in FIGS. 21 and 22. The detecting wheel 13 is provided with a concentric annular rib 13i on the inside thereof. The outer periphery of said annular rib 13i is adapted to be fitted in and supported by an annular concave portion 4e formed integrally with the fly-wheel 4.

Figure 23:
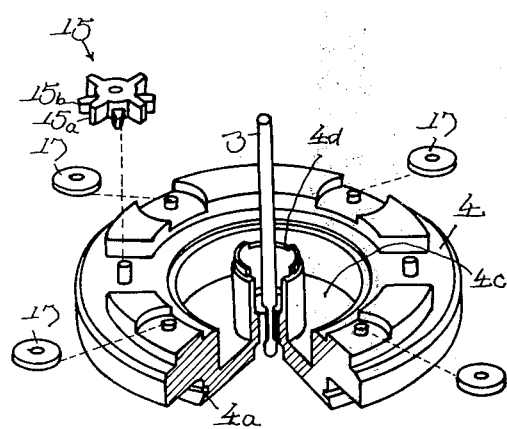
FIG. 23 is a perspective view showing a further automatic shut-off device according to the present invention wherein a roller member is provided in a fly wheel.
Figure 24:
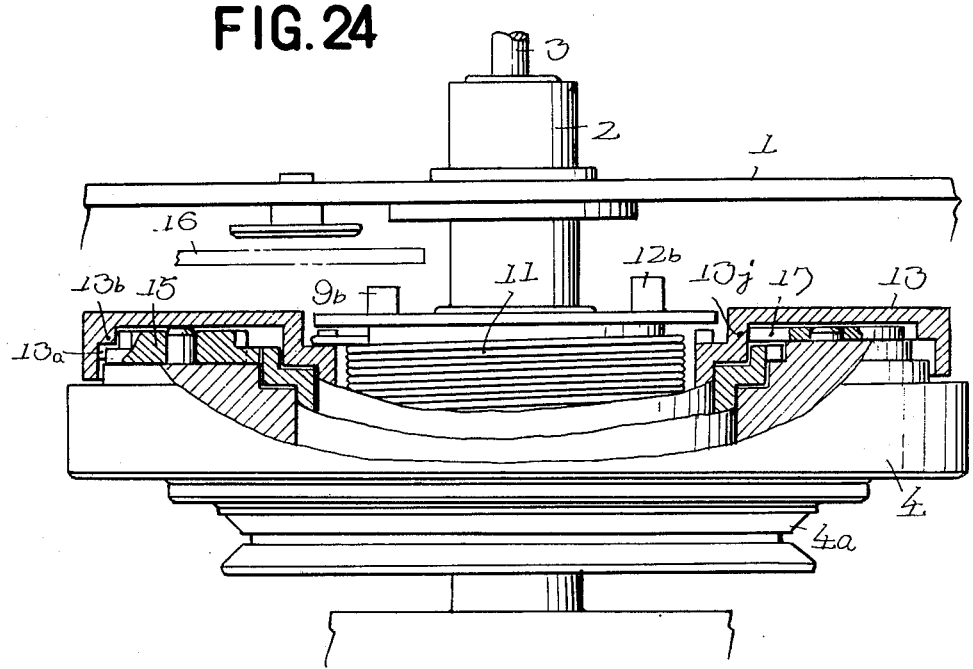
FIG. 24 is a partially cut out side-elevational view of FIG. 23.

Another example of the structure is shown in FIGS. 23 and 24, wherein roller members 17 are provided on the fly-wheel 4 at equal intervals in well-balanced positions. Each of said roller member 17 bears the outer periphery of a bearing portion 13j provided on the detecting wheel 13.

Figure 25:
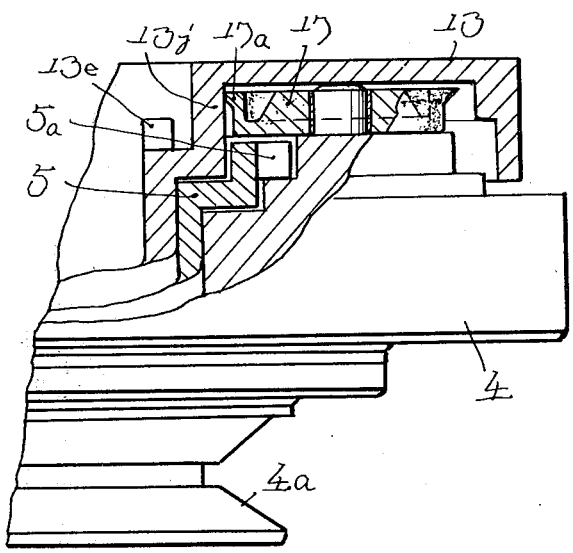
FIG. 25 is a side-elevational view showing a roller member provided with a resilient edge which is flexible through contact with the detecting wheel.

A still further modification is given, wherein the roller members 17 are each provided, on their respective peripheries, with resilient edges 17a (see FIG. 25) which are flexible through a the contact, with the detecting wheel 13. Thus, this resilient edge as specified acts effectively to prevent a rotational noise which is likely to be generated in case the detecting wheel 13 is borne by an ordinary roller members.

What is claimed is:

1. An automatic stop unit for use with a tape recorder, comprising
    a fly-wheel;
    an idler wheel disposed concentrically relative to said fly-wheel;
    clutch means which connects and thereby provides linkage between said fly-wheel and said idler wheel such that, when a braking load greater than a determined magnitude is applied to the idler wheel, said clutch means permit relative rotational slip between said two wheels which disconnects the linkage between said wheels; and
    actuator means actuated when the linkage is disconnected between said wheels, said actuator means including an external actuating element.

2. An automatic stop unit according to the claim 1, comprising
    a first projection in which said actuator means is so supported as to be freely projected and retracted in the axial direction of the fly-wheel; wherein, when said two wheels are linked together by way of said clutch means, said first projection is at a retracted position and, when said two wheels are disconnected, said first projection moves toward the projecting position and, at the projected position, said external actuating element is pushed and moved from a normal position to a second position with the rotation of said wheels: and
    a second projection which cooperates with said external actuating element with the rotation of the wheels.

3. An automatic stop unit according to the claim 1, wherein said external actuating element is a lever mechanism which interrupts the supply of drive force to the fly-wheel.

4. An automatic stop unit according to claim 2, comprising
    a control member in which is incorporated a control means which controls the projecting timing of the first projection of said actuator means, and wherein said control means is intermittently rotated by the fly-wheel which is driven even after the clutch means has been disconnected; and
    means which projects said first projection when said control means is moved in the circumferential direction by a determined distance.

5. An automatic stop unit according to claim 4, wherein said first projection and control member are constituted as a single unit.

6. An automatic stop unit according to claim 4 comprising a resilient means which always pushes the first projection toward the projecting position, said control member being fitted to a cam leg formed on the second projection and being held at the retracted position of the first projection against the pushing force of said resilient means, a cam notch being formed on the surface to which is fitted said cam leg of said control member, so that when said cam notch and cam leg are aligned together, both the control member and the first projection are displaced toward the projecting position by way of said resilient means.

7. An automatic stop unit according to claim 5, comprising a resilient means which always pushes the first projection toward the projecting position, said control member being fitted to a cam leg formed on the second projection and being held at the retracted position of the first projection against the pushing force of said resilient means, a cam notch being formed on the surface to which is fitted said cam leg of said control member, so that when said cam notch and cam leg are aligned together, but the control member and the first projection are displaced toward the projecting position by way of said resilient means.

8. An automatic stop unit according to claim 6, comprising annular rib concentric on the inner side of the idler wheel, a groove which fits to said rib being provided on the inner side of said fly-wheel, the idler wheel being fitted to the spindle of the fly-wheel upon contact with said rib and groove.

9. An automatic stop unit according to claim 6 comprising roller members separated in circumferential direction on the fly-wheel, said roller members being rotated upon contact with the peripheral surface of the spindle of the idler wheel, whereby the edler wheel is supported on the fly-wheel.

10. An automatic stop unit according to claim 9, an annular edge which can undergo resilient deformation protruding on the peripheral surface of said roller members.

* * * * *